United States Patent
Corso (10) Patent No.: US 10,520,099 B2
(45) Date of Patent: Dec. 31, 2019

(54) VALVE HAVING A VALVE INSERT

(71) Applicant: IMI HYDRONIC ENGINEERING INTERNATIONAL SA, Eysins (CH)

(72) Inventor: Daniel Corso, Ljung (SE)

(73) Assignee: IMI HYDRONIC ENGINEERING INTERNATIONAL SA, Eysins (CH)

(*) Notice: Subject to any disclaimer, the term of this patent is extended or adjusted under 35 U.S.C. 154(b) by 0 days.

(21) Appl. No.: 15/770,953

(22) PCT Filed: Oct. 25, 2016

(86) PCT No.: PCT/EP2016/075658
§ 371 (c)(1),
(2) Date: Apr. 25, 2018

(87) PCT Pub. No.: WO2017/072107
PCT Pub. Date: May 4, 2017

(65) Prior Publication Data
US 2018/0363784 A1 Dec. 20, 2018

(30) Foreign Application Priority Data
Oct. 27, 2015 (EP) .................................... 15191677

(51) Int. Cl.
*F16K 1/42* (2006.01)
*F16K 1/54* (2006.01)
*F16K 3/24* (2006.01)

(52) U.S. Cl.
CPC .................. *F16K 1/42* (2013.01); *F16K 1/54* (2013.01); *F16K 3/246* (2013.01)

(58) Field of Classification Search
CPC ... F16K 1/42; F16K 1/54; F16K 3/246; F16K 3/34; Y10T 137/86759; Y10T 137/86791; Y10T 137/86799

(Continued)

(56) References Cited

U.S. PATENT DOCUMENTS 921,741 A * 5/1909 Rowe ........................ F16K 1/42
251/360
2002/0017327 A1 2/2002 Kawaai et al.
(Continued)

FOREIGN PATENT DOCUMENTS

CN 1668869 A 9/2005
CN 1769751 A 5/2006
(Continued)

OTHER PUBLICATIONS

Translation of JPS59144867 (Year: 2019).*
(Continued)

*Primary Examiner* — Kevin F Murphy
*Assistant Examiner* — Kelsey E Cary
(74) *Attorney, Agent, or Firm* — Buchanan Ingersoll & Rooney P.C.

(57) ABSTRACT

A valve for controlling fluid flow that includes a valve body and a chamber arranged inside the valve body. The chamber has a proximal chamber surface and a distal chamber surface being opposite to the proximal chamber surface. The valve further includes a fluid inlet, a fluid outlet, a valve rod and a valve plug. The valve plug and the valve rod are arranged to control fluid flow from the fluid inlet to the fluid outlet via the chamber. The valve further includes a valve insert arranged at least partly inside the chamber. The valve insert includes a proximal portion and at least two distal portions, and the valve plug is adapted to be guided through at least a part of the valve insert. At least one of the distal portions is resiliently arranged relative the proximal portion in order for the distal portions to be movable relative each other.

20 Claims, 5 Drawing Sheets (58) Field of Classification Search
USPC .............. 251/360, 118; 137/625.33, 625.37, 137/625.38
See application file for complete search history.

(56) References Cited

U.S. PATENT DOCUMENTS

| | | | |
|---|---|---|---|
| 2008/0196765 | A1 | 8/2008 | Perrin et al. |
| 2009/0025795 | A1 | 1/2009 | Wears |
| 2009/0255250 | A1 | 10/2009 | Yin et al. |
| 2013/0025723 | A1* | 1/2013 | Dutrop .................. F16K 25/04 137/625.3 |

FOREIGN PATENT DOCUMENTS

| | | |
|---|---|---|
| CN | 101555825 A | 10/2009 |
| CN | 101779070 A | 7/2010 |
| GB | 2 424 465 A | 9/2006 |
| JP | 59-144867 A | 8/1984 |

OTHER PUBLICATIONS

Office Action (The First Office Action) dated Feb. 25, 2019 by the State Intellectual Property Office of the People's Republic of China in corresponding Chinese Patent Application No. 201680063467.8 and an English Translation of the Office Action. (15 pages).
International Search Report (PCT/ISA/210) dated Dec. 1, 2016, by the European Patent Office as the International Searching Authority for International Application No. PCT/EP2016/075658.
Written Opinion (PCT/ISA/237) dated Dec. 1, 2016, by the European Patent Office as the International Searching Authority for International Application No. PCT/EP2016/075658.
Office Action (Communication pursuant to Article 94(3) EPC) dated May 22, 2019 by the European Patent Office in corresponding European Application No. 16 787 805.7-1015, (5 pages).

* cited by examiner

VALVE HAVING A VALVE INSERT

TECHNICAL FIELD OF THE INVENTION

The present inventive concept relates to a valve having a valve insert for controlling fluid flow though the valve. The inventive concept also relates to a fluid distribution system comprising such a valve.

BACKGROUND OF THE INVENTION

Fluid distribution systems, for e.g. heating, cooling and water supply are designed to feed a fluid from a source to a consumption point. Each consumption point typically has a calculated and designed flow or differential pressure requirement. However, depending on the type of hydronic system, the flow requirement is often variable over time and can change with factors like seasonality (e.g. summer or winter), that changes the load from the consumption points, temperature changes of the system fluid, changes in consumption of the system fluid (e.g. for drinking water).

Control valves are frequently used in fluid distribution systems and have a variable opening such that the flow rates can be controlled. Hereby, the flow fed to the consumption point may be varied in an effective manner.

A control valve typically controls the flow by a closing arrangement, the closing arrangement comprising a closing member and a closing member receiving portion arranged to receive the closing member. The closing member may e.g. be a valve rod and a valve plug and the closing member receiving portion a valve seat, or the valve may e.g. be a ball valve where the closing member is shaped as a ball which is arranged to rotate and shift its position relative the closing member receiving portion and thereby change the opening degree of the closing arrangement.

The control valve can be arranged in a closed state where no fluid, or only a leakage flow, is allowed to flow through the closing arrangement, and in at least one open state where fluid is allowed to flow through the closing arrangement. In the closed state, the closing member is typically positioned to be in contact, such as in a sealing contact, with the closing member receiving portion.

While the control valves is beneficial for obtaining varying flows in the fluid distribution system, they have the drawback that they require a precise design of the closing member and/or the closing member receiving portion in order for the closed and open states to function properly. For instance, if the closing member is made larger or smaller than intended, it might not be received by the closing member receiving portion in a desired manner. For example, a higher fluid flow than what is allowed might flow through the valve in its closed state and/or the force for moving the closing member might become too large as it is constantly in a high frictional contact with the closing member receiving portion and/or other interior components within the valve.

Thus, it would be desirable to provide a valve having larger manufacturing tolerances.

SUMMARY OF THE INVENTION

An object of the present inventive concept is to provide a valve having a function for allowing larger manufacturing tolerances of the internal valve parts and/or which better adapt to the present manufacturing tolerances of the internal valve parts, and which at least partly alleviates the above mentioned drawbacks of existing valves. This and other objects, which will become apparent in the following, are accomplished by a valve as defined in the accompanying claims.

The present inventive concept is based on the insight that a valve insert which, at least to some extent, is resiliently arranged inside the valve can make up for such manufacturing tolerances. In particular, by providing a valve insert having at least two portions which are movable relative each other, the manufacturing tolerances can be at least partly be assimilated by the relative movement of the two portions.

According to a first aspect of the present inventive concept, there is provided a valve for controlling fluid flow. The valve comprises:

a valve body, a chamber arranged inside said valve body, said chamber having a proximal chamber surface and a distal chamber surface being opposite to said proximal chamber surface, a fluid inlet for providing fluid to said chamber, a fluid outlet for receiving fluid from said chamber, a valve rod arranged at least partly inside said chamber, a valve plug arranged to be moved inside said chamber, said valve plug being connected to an end portion of said valve rod, said valve rod and said valve plug being configured to control fluid flow from said fluid inlet to said fluid outlet via said chamber, a valve insert arranged at least partly inside said chamber, said valve insert comprising a proximal portion and at least two distal portions, wherein said valve plug is adapted to be guided through at least a part of said valve insert, and wherein at least one of said distal portions of said valve insert is resiliently arranged relative said proximal portion in order for the distal portions to be movable relative each other.

Thus, the relative movement of the at least two distal portions can, at least partly, make up for manufacturing tolerances of internal components in the valve. For example, and according to at least one example embodiment, the distal portions is arranged to at least partly encompass the valve plug. Hereby, the valve becomes less sensitive to a valve plug which is made larger than the designed size, as the distal portions can be moved relative each other and thereby adapt to the larger size of the valve plug. Correspondingly, if the valve plug is made smaller than the designed size, the distal portions can be moved relative each other and thereby adapt to the smaller size of the valve plug. Hence, in other words, the distal portions can make up for manufacturing tolerances of the valve plug. Furthermore, the valve insert can according to some embodiments make up for manufacturing tolerances in the size of the chamber.

It should be noted that the at least one resiliently arranged distal portion is resiliently arranged relative the proximal portion. Hence the at least one resiliently arranged distal portion may be moved relative the proximal portion and thereby also be moved relative the other distal portion(s), the other distal portion(s) may, or may not be, resiliently arranged relative the proximal portion.

In a cylindrical coordinate system ($\rho$, $\varphi$, z), the valve insert has an extension in the circumferential direction $\varphi$ (corresponding to a direction of the angle of the angular coordinate $\varphi$), an extension in the radial direction $\rho$, and an extension in a direction being perpendicular to both the circumferential direction $\varphi$ and the radial direction $\rho$ corresponding a z-direction along the height z.

It should be noted that the valve rod may be at least partly arranged outside of the chamber, and that the valve rod may extend from outside of the chamber to inside of the chamber by extending through said proximal chamber surface.

According to at least one example embodiment, the valve comprises a fluid passageway directing fluid from said fluid inlet to said fluid outlet via said chamber, wherein the fluid passageway directs fluid through said valve insert, in a direction from said distal portions of the valve insert towards said proximal portion of the valve insert. Thus, said proximal portion may be located downstream of said distal portions. Accordingly, when the fluid passageway is open, fluid is allowed to flow from said fluid inlet to said distal portions, and may then continue to flow from said distal portions towards said proximal portion before reaching said fluid outlet.

As will be discussed later, but which is briefly mentioned here, the valve may be arranged in a closed state in which the valve plug is arranged in a closed position wherein said valve plug is in sealing contact with a valve seat in order to allow no fluid, or only a leakage flow, to flow via said chamber. Thus, according to at least one example embodiment, the valve comprises a valve seat adapted to mate with said valve plug. The valve seat may e.g. be comprised in the valve body downstream of the fluid inlet, such as e.g. be comprised in the distal chamber surface, or the valve seat may e.g. be comprised in the valve insert. For example, the at least two distal portions may at least partly make up, or be comprised in, said valve seat.

Furthermore, the valve may be arranged in at least a first open state in which said valve plug is arranged in a first open position wherein said valve plug is distant from said valve seat and fluid is allowed to flow through said chamber.

It should be noted that when the valve is closed, the valve plug is arranged closer to the distal chamber surface compared to the proximal chamber surface.

Preferably, the proximal portion of the valve insert is positioned at, or adjacent to the proximal chamber surface. According to at least one example embodiment, said proximal portion of said valve insert comprises a proximal portion surface arranged to face said proximal chamber surface.

Correspondingly, the distal portions of the valve insert are preferably positioned at, or adjacent to the distal chamber surface. According to at least one example embodiment, the at least two distal portions is each comprising a distal portion surface arranged to face said distal chamber surface.

According to at least one example embodiment, at least one of said distal portions of said valve insert is in a first state adapted to be moved towards at least one other distal portion of valve insert, and in a second state adapted to be moved away from at least one other distal portion of the valve seat.

Hereby, the distal portions may be moved relative each other. That is, they may be moved relatively away from each other and they may be moved relatively closer to each other.

According to at least one example embodiment, said distal portions of said valve insert are in the first state adapted to be moved towards each other, and in a second state are adapted to be moved away from each other.

According to at least one example embodiment, said distal portions are separated by a gap in a circumferential direction of said valve insert.

In other words, the distal portions are at least partly separated from each other. According to at least one example embodiment, the distal portions are separated from each other, at least in the circumferential direction of said valve insert.

Thus, the first state, where the distal portions are moved relatively closer to each other, typically leads to that the gap is reduced or even eliminated whereby the distal portions may come into contact with each other. Correspondingly, the second state, where the distal portions are moved relatively further away from each other, typically leads to that the gap is increased. In other words, the distal portions may be moved relative each other at least partly due to the gap.

It should be noted that each distal portion is preferably associated with a gap. Hence, as the valve insert comprises at least two distal portions, at least two gaps preferably separate the at least two distal portions. For embodiments having more distal portions, such as e.g. three distal portions, the three distal portions are preferably separated by three gaps.

According to at least one alternative example embodiment, the distal portions are not separated by a gap, but are instead connected to each other by some connecting means. For such embodiments, the connecting means should preferably allow for a relative movement between the at least two distal portions, e.g. by that the connecting means is a resilient connecting means. The resilient connecting means may, according to at least one example embodiment be made in one piece with the respective distal portion, and/or alternatively the whole of the each one of the distal portions is made of a resilient material thereby allowing the distal portions to be moved relative each other.

According to at least one example embodiment, said distal portions have a main extension in a circumferential direction of said valve insert, and each one of said distal portions is arranged as a circumferential segment.

In other words, the distal portions may commonly be referred to as a distal portion arrangement, wherein said distal portion arrangement is segmented into at least two distal portions. The distal portion arrangement may thus be described as a circular-shaped arrangement which is segmented into the distal portions. Each one of the distal portion is thus a circular-shaped segment preferably separated from another distal portion by a gag or a slit.

According to at least one example embodiment, said proximal portion has a main extension in a circumferential direction of said valve insert.

The proximal portion is preferably non-segmented. In other words, the proximal portion is preferably continuous or cohesive. The proximal portion is preferably circular-shaped, or ring-shaped, and is preferably arranged parallel to the distal portions, or to the distal portion arrangement. Hereby, each one of the distal portions may in a similar manner be connected to the proximal portion.

According to at least one example embodiment, said proximal portion is connected to each one of said distal portions by a respective connecting leg.

Hence, the valve insert comprises at least two connecting leg, a first connecting leg connecting one of the at least two distal portions (e.g. a first distal portion) to the proximal portion, and a second connecting leg connecting the other one of the at least two distal portions (e.g. a second distal portion) to the proximal portion. For a valve insert having three distal portions, at least three connecting legs are provided, each connecting leg connecting a respective distal portion to the proximal portion.

Thus, each one of the distal portions together with its respective connecting leg may be described as a connecting leg, distal portion arrangement. Hence, at least one of the connecting leg, distal portion arrangement is resiliently arranged relative to the proximal portion in order for the at least two distal portions to be movable relative each other. Thus, at least one of the connecting legs is resiliently arranged to the proximal portion, and/or is resiliently arranged to its distal portion, the important function still being that at least one of the distal portions is movable relative at least one other distal portion. According to at least one example embodiment, each one of the connecting legs is resiliently arranged to the proximal portion, and/or is resiliently arranged to its distal portion.

According to at least one example embodiment, the valve further comprises a spring arranged between said proximal chamber surface and said proximal portion of said valve insert, said spring being arranged to press said valve insert towards said distal chamber surface.

Hereby, the spring and the valve insert may make up for manufacturing tolerances in the size of the chamber, and/or in the position of the valve seat.

The spring is preferably circumferentially arranged along the whole of the circumferential direction of the proximal portion. The spring may e.g. be a wave spring, a leaf spring or a coil spring.

According to at least one example embodiment, instead of the above spring, the valve insert may comprise a spring portion arranged between the proximal chamber surface and the proximal portion of the valve insert. The spring portion having the same function as the above mentioned spring.

According to at least one example embodiment, said valve insert and said spring (or said spring portion) are arranged inside said chamber in such a way that said distal portions are pressed against said valve plug by said spring (or said spring portion).

Said valve insert may be arranged such that it is pressed between the spring and the valve plug.

According to at least one example embodiment, said valve insert is arranged radially outwardly of said valve plug. Hereby, the spring may press the distal portions radially inwardly towards said valve plug. Thus, the distal portions of the valve insert may, in an unassembled state where the valve insert is not installed into the valve, be arranged further away from each other compared to when the valve insert is installed into the valve (i.e. in its assembled state). In the unassembled state, there is no force, internal or external, acting to move the distal portions relative each other. Thus, compared to the assembled state, the distal portions may in the unassembled state be considered to be unbiased. When the valve insert is assembled into the valve, the spring and the designs of the valve and the valve insert allow for the distal portions to be moved towards each other and thereby be pressed against the valve plug.

However, it should be noted that the valve insert can, in the unassembled state be arranged with distal portions which are arranged closer to each other compared to when the valve insert is installed into the valve (i.e. in its assembled state). In other words, the distal portions of the valve insert may be considered as being pre-compressed as compared to its assembled state. For such embodiments, the spring may be omitted as the valve plug itself will press the distal portions away from each other while still achieving the effect of having the distal portions being pressed towards the valve plug. Alternatively, the spring may still be included in such embodiments to further press the distal portions towards and/or against the valve plug.

According to at least one example embodiment, a portion of said distal chamber surface defines a receiving portion for said valve insert, wherein said receiving portion is beveled.

Preferably, the distal portions of the valve insert are received in the receiving portion. Thus, hereby means for allowing the spring to press the distal portions towards each other is provided. Thus, the receiving portion is preferably beveled at least partly in a direction being parallel to a radially inwardly direction towards a centreline of said valve insert. The receiving portion may be beveled at least partly in the radial direction and/or be beveled at least partly in a direction away from said proximal chamber surface. For example the receiving portion may be beveled in a direction from said proximal chamber surface and at least partly in the radial direction.

Hereby, the force acting on the valve insert by the spring may be transferred into a compressing movement of the distal portions, i.e. a transfer of a force in one direction (e.g. a direction from the proximal chamber surface to the distal chamber surface, i.e. a proximal-distal direction) to a force in another direction (e.g. an at least partly radial direction or a direction having at least one component being perpendicular to the proximal-distal direction).

According to at least one example embodiment, a receiving portion facing surface of each one of the distal portions is beveled in a corresponding manner as said receiving portion.

In other words, the receiving portion facing surfaces are beveled in the same direction as the receiving portion. Thus, the beveled receiving portion facing surfaces mate with the beveled receiving portion.

Hereby, the transfer of direction of the force from the spring as described above is further improved.

According to at least one example embodiment, the valve seat is arranged in the distal chamber surface internally of the receiving portion. According to at least one example embodiment, the valve seat is beveled in a corresponding manner as the receiving portion. According to at least one example embodiment, the receiving portion extends into the valve seat and forms a common beveled surface together with the valve seat. According to at least one example embodiment, the receiving portion and the valve seat are separated by a protrusion or a nob.

According to at least one example embodiment, said valve plug comprises a controlling portion, said controlling portion being arranged to control fluid flow from an inside of said valve insert to an outside of said valve insert or from an outside of said valve insert to an inside of said valve insert.

Hence, according to at least one embodiment, the controlling portion is the portion of the valve plug which is arranged to first encounter the fluid flow from the fluid inlet. According to at least one example embodiment, the controlling portion is the portion of the valve plug which is arranged furthest upstream in the valve.

Thus, the controlling portion may e.g. be a flat portion, such as an underside of the valve plug, for embodiments where the fluid flows from the inside of the valve insert and radially outwardly to the outside of the valve insert.

The distance X (described below) may for example be the shortest distance (in e.g. the z-direction) from the controlling portion of the valve plug to the valve seat.

According to at least one example embodiment, each one of said distal portions comprises a characteristic controlling portion having a varying height in circumferential direction of said valve insert.

According to at least one example embodiment, each one of the characteristic controlling portions is varying in height from a an end sub-portion being adjacent to the respective gap separating the distal portions, towards the respective connecting leg of the distal portions. According to at least one example embodiment, each one of the characteristic controlling portions is curved from the end sub-portion (where the respective characteristic controlling portion has it smallest height) towards the respective connecting leg of the distal portions. The curve may for example be sharp near the end sub-portion, and relatively more flat towards the respective connecting leg. The curve may for example be shaped such that the resulting valve characteristic is EQM-shaped when fluid flows pass the characteristic controlling portions. The curve may alternatively be described as being logarithmically-shaped.

According to at least one example embodiment, the extension of the characteristic controlling portion of each one of distal portion in the z-direction is at least partly continuously varying in the circumferential direction.

According to at least one example embodiment, the characteristic controlling portions at least partly define the valve characteristic by a first function $f1(X)=Y$ wherein X is the distance of the valve plug compared to the valve seat (preferably the distance in the z-direction) from the controlling portion of the valve plug and the valve seat). $X=0$ is defining the valve plug in its closed position and Y is the cross sectional area of at least one flow-through section which flow may flow through the valve insert, as defined in the detailed description. The first function $f1(X)=Y$ may preferably be curved as previously described and may e.g. follow an EQM function, as defined below, with parameter a being between 0.1 and 0.8, or more preferably between 0.2 and 0.6 or more preferably between 0.2 and 0.4, or approximately around 0.25. The EQM function may be defined as $$Y\,[\%]=100*a/(100/X-1+a)$$

where X is the position of the closing member expressed in percentage of its maximum position (Xmax), a is a variable correlated to the shape of the function, and Y is the cross sectional area of the flow-through section(s) expressed in percentage of the valves respective maximum cross sectional area of the flow-through section(s) (Ymax), that is either for the valve when being subject to a restriction of the closing member (e.g. a lift limitation) or not (e.g. no lift limitation).

According to at least one example embodiment, said characteristic controlling portions is first characteristic controlling portions, and each one of said distal portions comprises a second characteristic controlling portion formed as a step.

According to at least one example embodiment, each one of the second characteristic controlling portions is varying in height in a step-shaped manner from the respective first characteristic control portion (where the respective second characteristic controlling portion has it smallest height) towards the respective connecting leg of the distal portions.

In other words, the extension of the second characteristic controlling portion of each one of the distal portions in the z-direction is at least partly varying in a step in the circumferential direction.

According to at least one example embodiment, the second characteristic controlling portions at least partly define the valve characteristic by a second function $f2(X)=Y$ wherein X and Y are defined as above. The second function is different from said first function. For example, the derivate of the first function $df1(X)=dY$ is greater compared to a derivate of the second function $df2(X)=dY$ over a majority of X. The second function $f2(X)=Y$ may preferably be linear.

Thus, a valve insert having distal portions comprising first and second characteristic controlling portions, provide for the possibility of having a valve characteristic be defined by at least two different valve characteristic functions. Hereby the valve can be used with different lift limitations (or no lift limitation) and still provide a good enough valve characteristic.

As mentioned above, the valve may be arranged in at least a closed state and a first open state depending on the position of the valve plug. However, the valve may also have a second open state being different from said first open state. Hence, according to at least one example embodiment, said valve can be arranged in:

a closed state in which said valve plug is arranged in a closed position in which said valve plug is in sealing contact with a valve seat in order to allow no fluid, or only a leakage flow, to flow via said chamber, a first open state in which said valve plug is arranged in a first open position in which said valve plug is distant from said valve seat, and a second open state in which said valve plug is arranged in a second open position in which said valve plug is less distant from said valve seat compared to when said valve plug is in its first open position, and wherein when said valve plug is positioned between its closed position and its second open position, said valve plug allows fluid flow through said chamber and through said valve insert over said characteristic controlling portions, and wherein a change of said valve plug position anywhere between its closed position and its second open position results in a change of fluid flow through said chamber in accordance with a first valve characteristic function.

In other words, the first characteristic controlling portions at least partly defines the first valve characteristics function.

It should be understood that a change of said valve plug position anywhere between its closed position and its second open position results in a change of cross sectional area of the flow-through section(s) as the fluid flow through said chamber is depending on the fluid flow through the flow-through section(s) which in turn is depending on the size, i.e. the cross sectional area, of the flow-through section(s). Thus, between the closed position and the second open position, the change in cross sectional area of the flow-through section(s) in relation to the position of the valve plug, is in accordance with the first valve characteristic function.

According to at least one example embodiment, when said valve plug is positioned between its second open position and its first open position, said valve plug allows fluid flow through said chamber and through said valve insert over said first and said second characteristic controlling portions, and wherein a change of said valve plug position anywhere between its second open position and its first open position results in a change of fluid flow through said chamber in accordance with a second valve characteristic function.

In other words, the second characteristic controlling portions at least partly defines the second valve characteristic function.

Correspondingly, it should be understood that a change of said valve plug position anywhere between its second open position and its first open position results in a change of cross sectional area of the flow-through section(s) as the fluid flow through said chamber is depending on the fluid flow through the flow-through section(s) which in turn is depending on the size, i.e. the cross sectional area, of the flow-through section(s). Thus, between the second open position and the first open position, the change in cross sectional area of the flow-through section(s) in relation to the position of the valve plug, is in accordance with the second valve characteristic function.

It should be noted that the valve body is a general term relating to the parts and portions housing and holding the various components of the valve. Thus the valve body may be referred to as a valve housing and may comprises one or more parts and sections.

It should be understood that said fluid inlet is arranged for providing/guiding fluid into the valve, and that said fluid outlet is arranged for guiding fluid out from said valve. In a fluid distribution system in which the valve is installed, the fluid outlet is preferably fluidly connected to a consumption point, such as e.g. a cooling unit or a heating unit, arranged downstream of the valve in the fluid distribution system. Furthermore, upstream of the valve the fluid inlet is preferably fluidly connected to a fluid source. Thus, according to at least a second aspect of the present inventive concept, a fluid distribution system is provided. The fluid distribution system comprises a valve according to the first aspect of the present inventive concept.

Thus it should be understood that according to at least one example embodiment, the main fluid flow through the valve is flowing through the chamber and the valve insert.

According to at least one example embodiment, the valve comprises a closing arrangement comprising the valve rod, the valve plug and the valve seat. According to at least one example embodiment, the closing arrangement further comprises the valve insert.

According to at least one example embodiment, the valve comprises a lift limitation means for enabling lift limitation of the valve. The lift limitation may e.g. comprise a screw nut arrangement, wherein the nut is arranged inside chamber and is configured to act as a stop for the valve plug. Furthermore, the screw may be adapted to alter the position of the nut within the chamber relative the valve plug. Thus, by adapting the position of the nut, different heights (such as in the z-direction) of where the valve plug stops against the nut may be provided. Hence, if the valve is to be subject to a lift limitation resulting in e.g. 40% (as compared to the respective maximum) of the cross sectional area of the flow-through section(s) or the Kv-value, the screw is operated such that the nut is positioned inside the chamber relative the valve plug in such a way that the valve plug may not be moved above a position where the resulting cross sectional area of the flow-through section(s) or the Kv-value is above 40% of its (non lift-limited) value. Kv may be described as a pressure correlated flow through the valve. In other words Kv specifies the volume of fluid (in m3) flowing through the valve during one hour (h) i.e. flow of fluid, q (m3/h) at a pressure drop (ΔP) across the valve. For example, Kv can be defined as:

$$Kv = q/(\Delta P/ra)^{1/2}$$

where ra (kg/m$^3$) is the density of the fluid. Alternatively, the pressure drop in the above definition is multiplied with the constant 1000 if the unit of the pressure drop is expressed in bars.

According to at least one example embodiment, the closing arrangement is a first closing arrangement or a control valve closing arrangement, and the valve further comprises a second closing arrangement or a differential pressure closing arrangement comprising a second valve rod, a second valve plug and a second valve seat. Hence the valve may be considered to comprise a differential pressure valve part at least partly defined by the differential pressure closing arrangement and a control valve part at least partly defined by the control valve closing arrangement which is arranged inside the above mentioned chamber and wherein the valve plug is at least partly arranged to be moved within the valve insert. In such embodiments, the differential pressure valve part and the control valve part are separated by a fluid passage.

DETAILED DESCRIPTION OF THE DRAWINGS

The above, as well as additional objects, features and advantages of the present inventive concept, will be better understood through the following illustrative and non-limiting detailed description of example embodiments of the present inventive concept, with reference to the appended drawings where the same reference numerals will be used for similar elements. In the following description, the present inventive concept is described with reference to a valve for controlling fluid flow through the valve.

Figure 1:
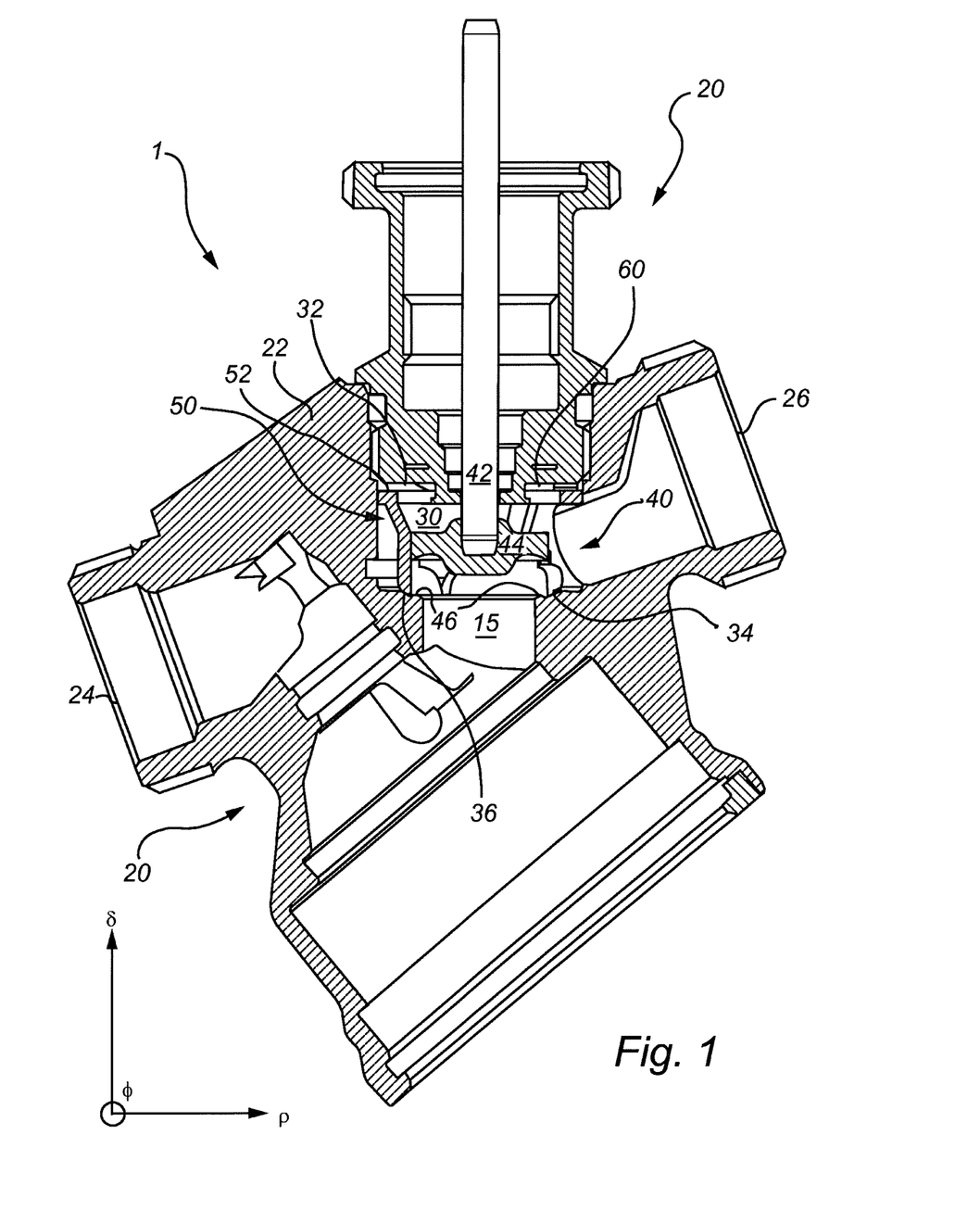
FIG. 1 is a cross-sectional view of a valve having a valve insert according to at least one example embodiment of the invention.

FIG. 1 illustrates a valve 1 comprising a differential pressure valve part 10 and a control valve part 20 in fluid communication via fluid passage 15. The differential pressure valve part 10 may limit the differential pressure to which the control valve part 20 is exposed. Therefore, the operating conditions for the control valve part 20 may be maintained at an adequate level despite variations of the pressure level in the entire fluid distribution system in where the valve 1 is installed. However, it should be noted that the differential pressure valve part 10 shown in FIG. 1 is optional and may be omitted, and in the following description the focus will be on the control valve part 20 which will be described in detail. Thus, according to at least one example embodiment, the differential pressure valve part 10 is omitted from the valve 1 and the differential pressure to which the control valve part 20 is exposed to is controlled by other means e.g. upstream of the control valve part 20. The differential pressure valve part 10 may also be comprised in a separate valve (not shown).

The valve 1 in FIG. 1 comprises a valve body 22, a chamber 30 arranged inside the valve body 22, a fluid inlet 24 for providing fluid to the chamber 30 and a fluid outlet 26 for receiving fluid from the chamber 30. Thus, the valve 1 is configured to, in use, and when correctly installed in a fluid distribution system, provide a fluid flow, such as a main fluid flow, from the fluid inlet 24 to the fluid outlet 26 via the chamber 30.

The chamber 30 comprises a proximal chamber surface 32 and a distal chamber surface 34. The distal chamber surface 34 is arranged opposite to the proximal chamber surface 32. It should be understood that the distal chamber surface 34 and the proximal chamber surface 32 may be comprised in the valve body 22 and/or be comprised in other interior parts of the valve 1.

As seen in FIG. 1, a valve seat 46 may be arranged in the distal chamber surface 34. In closed state, the valve plug 44 is arranged in closed position in which the valve plug 44 is in contact with the valve seat 46.

The valve rod 42 is arranged at least partly inside the chamber 30. As seen in FIG. 1, the valve rod 42 is also arranged at least partly outside the chamber 30, and is extending into the chamber 30 through a plane extending in the proximal chamber surface 32. The valve plug 44 is connected to an end portion of the valve rod 42, and the valve rod 42 and the valve plug 44 is arranged to be moved inside the chamber 30 in a direction towards the valve seat 46 and in a direction away from the valve seat 46.

The valve 1 further comprises a valve insert 50 arranged at least partly inside the chamber. In FIG. 1, the valve insert 50 is completely, or almost completely, arranged inside the chamber 30. The valve insert comprises a proximal portion 52 arranged adjacent to the proximal chamber surface 32, and at least two distal portions 54-56 (indicated in FIG. 2) arranged adjacent to the distal chamber surface 34. The valve plug 44 is configured to be guided through at least a part of the valve insert 50 by the valve rod 42. The valve rod 42, valve plug 44, the valve seat 46 and the valve insert 50 are configured to control fluid flow from the fluid inlet 24 to the fluid outlet 26 via the chamber 30. Thus, the valve rod 42, the valve plug 44, the valve seat 46 and the valve insert 50 may be referred to as a closing arrangement 40. The valve seat 46 may preferably be comprised in a portion of the valve body 22 and/or be comprised in the valve insert 50.

The valve 1 further comprises a spring 60 arranged between the proximal chamber surface 32 and the proximal portion 52 of the valve insert 50. The spring 60 is arranged to press the valve insert 50 towards the distal chamber surface 34. In other words, in FIG. 1, the proximal chamber surface 32 is in contact with at least a portion of the spring 60, and at least a portion of the spring 60 is in contact with the proximal portion 52 of the valve insert 50.

Furthermore, the valve insert 50 is arranged in the chamber 30 such that a fluid flows from the fluid inlet 24 to the fluid outlet 26 flows via the valve insert 50. Thus, the position of the valve plug 44 inside of the valve insert 50 at least partly determines the fluid flow from the valve inlet 24 to the valve outlet 26, this is further explained below.

Figure 2:
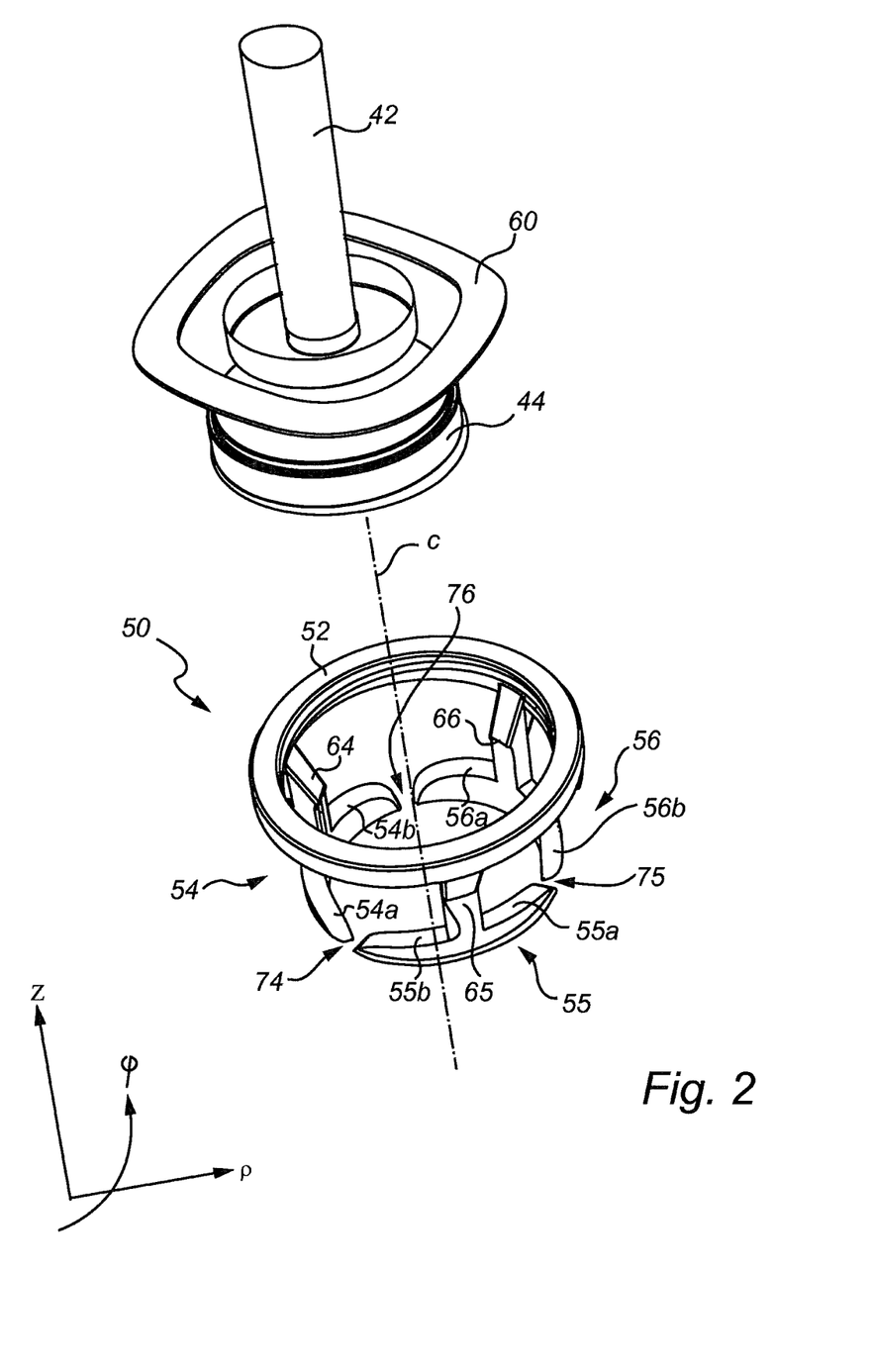
FIG. 2 is an exploded view of parts of the valve in FIG. 1 according to at least one example embodiment of the invention.

The structure of the valve insert 50 will now be described in more detail with reference to FIG. 2 illustrating the valve insert 50, the valve rod 42, the valve plug 44 and the spring 60 of FIG. 1 in a perspective view. In FIG. 2, the valve insert 50 is in an unassembled state, i.e. the valve insert 50 is shown as not being installed into the chamber 30 of the valve 1.

As illustrated in FIG. 2, the valve insert 50 comprises three distal portions 54-56, i.e. a first distal portion 54, a second distal portion 55 and a third distal portion 56. In FIG. 2, the three distal portions 54-56 are similar or identical to each other, but are arranged in different positions in relation to the proximal portion 52. However, according to at least one example embodiment, at least one of the distal portions 54-56 is different from at least one of the other distal portions 54-56.

In a cylindrical coordinate system ($\rho$, $\varphi$, z), the valve insert 50 has an extension in the circumferential direction $\varphi$ (corresponding to a direction of the angle of the angular coordinate $\varphi$), an extension in the radial direction $\rho$, and an extension in a direction being perpendicular to both the circumferential direction $\varphi$ and the radial direction $\rho$ corresponding a z-direction along the height z.

Figure 3:
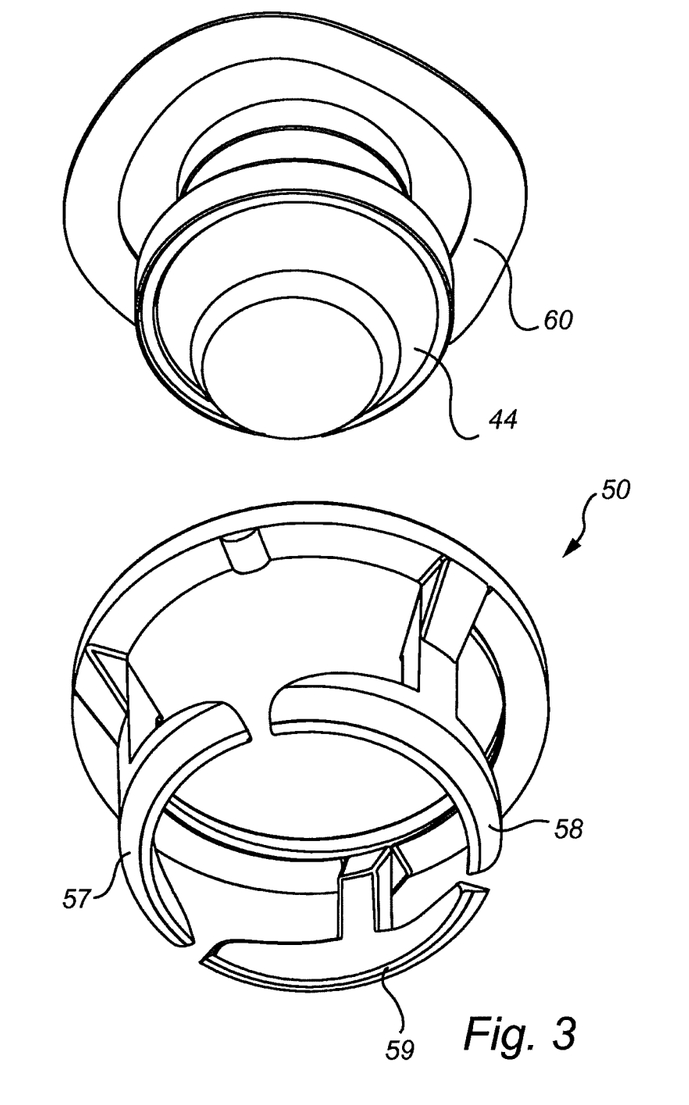
FIG. 3 is an exploded view of the parts FIG. 2 but from another direction according to at least one example embodiment of the invention.

Each one of the distal portions 54-56 has a main extension in the circumferential direction $\varphi$, an extension in the z-direction (corresponding to the height of each one of the distal portions 54-56), and an extension in the radial direction (corresponding to the thickness of each one of the distal portions 54-56). The height of each one of the distal portions 54-56 in FIG. 2 is varying. Furthermore, as each one of the distal portions 54-56 are beveled on the respective surface facing the distal chamber surface 34, the thickness of each one of the distal portions 54-56 are varying (better shown in FIG. 3). As seen in FIG. 2, each one of the distal portions 54-56 is arranged as a circumferential segment, or as a ring-shaped segment, separated from the other distal portions 54-56 by a respective gap 74-76.

The proximal portion 52 has a main extension in the circumferential direction $\varphi$, an extension in the z-direction (corresponding to the height of proximal portion 52), and an extension in the radial direction (corresponding to the thickness of the proximal portion 52). The proximal portion 52 in FIG. 2 is circular-shaped or ring-shaped and is non-segmented, i.e. it is continuous in the circumferential direction.

Each one of the distal portions 54-56 is connected to the proximal portion 52 by a respective connecting leg 64-66. Thus, a first connecting leg 64 is connecting the proximal portion 52 with the first distal portion 54, a second connecting leg 65 is connecting the proximal portion 52 with the second distal portion 55, and a third connecting leg 66 is connecting the proximal portion 52 with the third distal portion 56. Each of the connecting legs 64-66 is connected centrally to the respective distal portion 54-56. Furthermore, each one of the distal portions 54-56 is symmetrical along a section where each one of the distal portions 54-56 is connected to the respective connecting leg 64-66.

The distal portions 54-56 are resiliently arranged in the valve insert 50 and are movable relative each other. For the valve insert 50 illustrated in FIG. 2, each one of the distal portions 54-56 can be moved at least in the radial direction. For example, if the first distal portion 54 is moved in the radial direction towards a centreline C of the valve insert 50, the gap 74 between the first distal portion 54 and the second distal portion 55 as well as the gap 76 of the first distal portion 54 and the third distal portion 56 will be reduced and the first distal portion 54 will be arranged closer to both the second and third distal portions 54-56 as compared to before the movement. By a corresponding manner, the second and third distal portions 55, 56 are movable in the radial direction towards the centreline C of the valve insert 50. However, it should be noted that all of the distal portions 54-56 need not to, but may, be movable in the radial direction, as long as at least one of the distal portions 54-56 is movable relative the other distal portions 54-56. Additionally and/or alternatively, at least one of the distal portions 54-56 may be movable in the radial direction away from the centreline C of the valve insert 50 and may upon such movement increase the respective gaps 74-76 and the distances from the other distal portions 54-56.

The distal portions 54-56 may be resiliently arranged by different means. In FIG. 2, the distal portions 54-56 are allowed to move relative each other as they are arranged separately from each other, at least in a $\rho$, $\varphi$-plane extending through the distal portions 54-56, by gaps 74-76. Furthermore the configurations of the connecting legs 64-66 allow for movement of the respective distal portion 54-56. Hence, the valve insert 50 is preferably made in a material allowing for some resiliency, e.g. plastic or rubber or metal such as spring steel or similar material. However, the whole valve insert 50 needs not to be made in a material allowing for some resiliency but parts or portions of the valve insert 50 may be made in a rigid, non-resilient material. For example, as long as at least one of the connecting legs 64-66 is connected to the proximal portion 52 in such a way that the at least one connecting leg 64-66 can be slightly tilted, and/or that at least one of the connecting legs 64-66 is resiliently connected to the respective distal portion 54-56, whereby the distal portions 54-56 can be moved relative each other, the purpose of moving at least one distal portions 54-56 relative the other distal portions 54-56 is fulfilled. Thus, according to at least one example embodiment, at least the portion of at least one of the connecting legs 64-66 connected to the proximal portion 52 is made in a material allowing resiliency, or alternatively, at least one of the connecting legs 64-66 is hingely connected to the proximal portion 52 and/or the respective distal portion 54-56.

It should be understood that the distal portions 54-56 need to be separated by the respective gaps 74-76, but may as well be connected to each other by some connecting means, as long as the connecting means allow for a relative movement between at least two of the distal portions 54-56, e.g. by being a resilient connecting means. The resilient connecting means may be made in one piece with the respective distal portions 54-56 and/or the whole of the respective distal portions 54-56 may be made of a resilient material allowing the distal portions 54-56 to be moved relative each other. Thus, according to at least one example embodiment, at least one of the distal portions 54-56 is made of a resilient material allowing the at least one distal portion 54-56 to be movable relative the other distal portions 54-56.

It should be noted that the valve insert 50 in FIG. 2 discloses three distal portions 54-56, however according to at least one example embodiment the valve insert 50 comprises only two distal portions wherein at least one of the two distal portions are movable, such that the two distal portions may be moved relative each other. This is further discussed below with reference to FIGS. 4a-4b and FIGS. 5a-5b.

The function of the valve insert 50 will now be described in more detail. Turning back to FIG. 1, where the valve insert 50 is installed inside the chamber 30 as previously described, the distal portions 54-56 are movable relative each other as they are resiliently arranged in the valve insert 50. Hence, in a first state, the distal portions 54-56 may be moved towards each other, i.e. at least one of the distal portions 54-56 may be moved closer to at least one of the other distal portions 54-56, and in a second state at least one of the distal portions 54-56 may be moved away from at least one of the other distal portions 54-56.

The valve has a fluid passageway directing fluid from said fluid inlet to said fluid outlet via said chamber, wherein the fluid passageway directs fluid through said valve insert 50, in a direction from said distal portions 54-56 towards said proximal portion 52 of the valve insert.

As seen in FIG. 1, the valve insert 50 is compressed by the spring 60 between the spring 60 and the distal chamber surface 34. Thus, the spring 60 acts on the valve insert 50 by exerting a force in a direction from the proximal chamber surface 32 towards the distal chamber surface 34, i.e. a proximal-distal direction (for example in the z-direction). Furthermore, a portion of the distal chamber surface 34 defines a receiving portion 36 for the valve insert 50, and more specifically for the distal portions 54-56 of the valve insert 50. As seen in FIG. 1, the receiving portion 36 is beveled or inclined in a direction at least partly extending from the chamber 30 towards the fluid passage 15. Furthermore, a receiving portion facing surface 57, 58, 59 (shown in FIG. 3) of each one of the distal portions 54-56 is beveled in order to correspond to said receiving portion 36. Hereby, the force exerted from the spring 60 to the valve insert 50 in the proximal-distal direction may be transferred to a radial force via the beveled receiving portion 36 and the beveled receiving portion facing surfaces 57-59. According to at least one example embodiment, the beveled receiving portion 36 and the beveled receiving portion facing surfaces 57-59 allows the spring 60 to act on the valve insert 50 in such a way that the distal portions 54-56 are pushed towards each other. Hereby, the gaps 74-76 between the distal portions 54-56 may be reduced.

It should be noted that the seat 46 may be beveled in a corresponding manner as the receiving portion 36 of the distal chamber surface 34. Hence, according to at least one example embodiment, the receiving portion 36 and the seat 46 are comprised in a common beveled surface. However, according to at least one embodiment, the seat 46 and the receiving portion 36 is separated by a nob or protrusion which may act as a stop for the distal portions 54-56 of the valve insert 50.

As shown in FIG. 1, the dimensions of the valve plug 44 (at least the dimensions of the valve plug 44 in the radial direction) determines how much the distal portions 54-56 are allowed to be moved radially inwards towards the centreline C of the valve insert 50 (the centreline C is shown in FIG. 2). In other words, as the spring 60 acts on the valve insert 50 in such a way that the distal portions 54-56 are pushed towards each other, the valve plug 44 acts as a stop for the movement of the distal portions 54-56. Hence, the distal portions 54-56 will be pressed against the valve plug 44. This is advantageous as no flow, or a very low flow, will thereby be allowed to pass through and beyond the distal portions 54-56 and the valve plug 44 in the z-direction. Hereby an undesired fluid flow passage in the z-direction between the valve insert 50 and the valve plug 44 may be avoided or at least reduced.

One main advantage of having resiliently arranged distal portions 54-56, is that the valve 1 becomes more allowable for larger manufacturing tolerances related to e.g. the size of the valve seat 46 and/or the size and dimension of the valve plug 44 and/or size of the chamber 30 in where the valve inert 50 is arranged. In other words, one benefit of having resiliently arranged distal portions 54-56 which can be pressed towards the valve plug 44 is that the valve plug 44 can be made with larger manufacturing tolerances. That is, as the distal portions 54-56 are pressed against the valve plug 44, there is less need to have a precisely adapted size and dimension of the valve plug 44. Furthermore, the valve insert 50 may take up manufacturing tolerances of the chamber 30 and/or the position of the valve seat 46 as the valve insert 50 is compressed inside the chamber 30 by the spring 60.

Figures 4A, 4B:
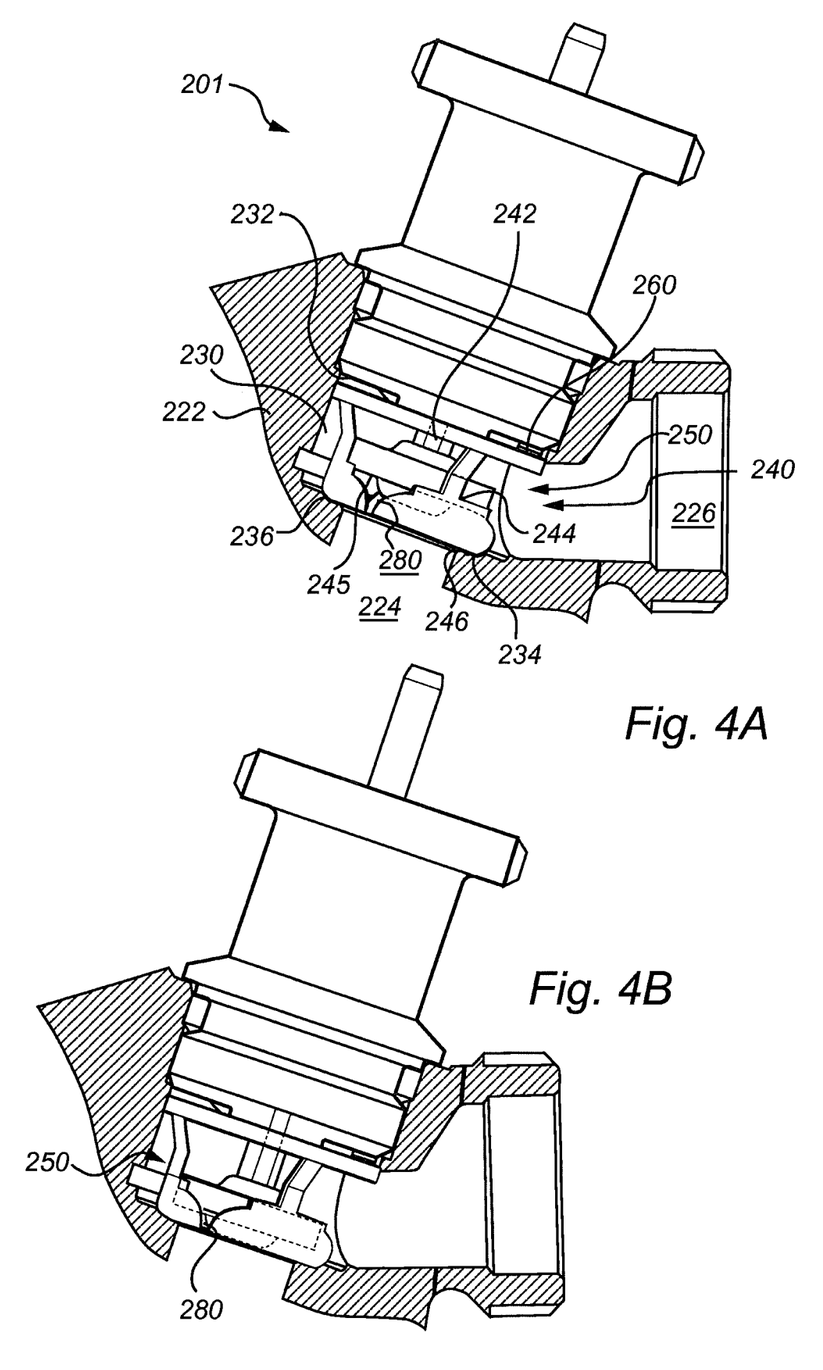
FIGS. 4a-4b are cross-sectional views of a valve showing different positions of the valve plug according to at least one example embodiment of the invention.

The control of fluid flow through a valve will now be described in more detail with reference to FIGS. 4a-4b illustrating a valve 201. The valve 201 in FIGS. 4a-4b is slightly different compared to the valve 1 of FIG. 1, e.g. by that a valve insert 250 in FIGS. 4a-4b is different from the valve insert 50 of FIGS. 1-2. However, as many of the features are similar between the two valves 1, 201, corresponding features will in FIGS. 4a-4b be indicated with the reference numeral used in FIGS. 1-2 but with the additional number of 200. For example, the spring 60 of FIGS. 1-2 will be referred to as spring 260 in FIGS. 4a-4b. In order to facilitate the reading comprehension, most reference numerals are only indicated in FIG. 4a as FIG. 4b illustrate the same valve 201 but in another opening state.

Similar to the valve 1 in FIG. 1, the valve 201 in FIGS. 4*a*-4*b* comprises a valve body 222, a chamber 230 arranged inside the valve body 222, a fluid inlet 224 for providing fluid to the chamber 230 and a fluid outlet 226 for receiving fluid from the chamber 230. Thus, the valve 201 is configured to, in use, and when correctly installed in a fluid distribution system, provide a fluid flow, such as a main fluid flow, from the fluid inlet 224 to the fluid outlet 226 via the chamber 230. The valve 201 further comprises a valve insert 250 installed into the valve 201, and a valve plug 244 attached to a valve rod 242 for controlling the fluid flow through the valve insert 250. Thus, the valve insert 250 is arranged in the chamber 230 such that a fluid may flow from the fluid inlet 224 to the fluid outlet 226 via the valve insert 250. Thus, the position of the valve plug 244 inside of the valve insert 250 at least partly controls the fluid flow from the valve inlet 224 to the valve outlet 226, this is further explained below.

As the chamber 30 of FIG. 1, the chamber 230 in FIGS. 4*a*-4*b* comprises a proximal chamber surface 232 and a distal chamber surface 234. The distal chamber surface 234 is arranged opposite to the proximal chamber surface 232. It should be understood that the distal chamber surface 234 and the proximal chamber surface 232 may be comprised in the valve body 222 and/or be comprised in other interior parts of the valve 201.

Figure 5A:
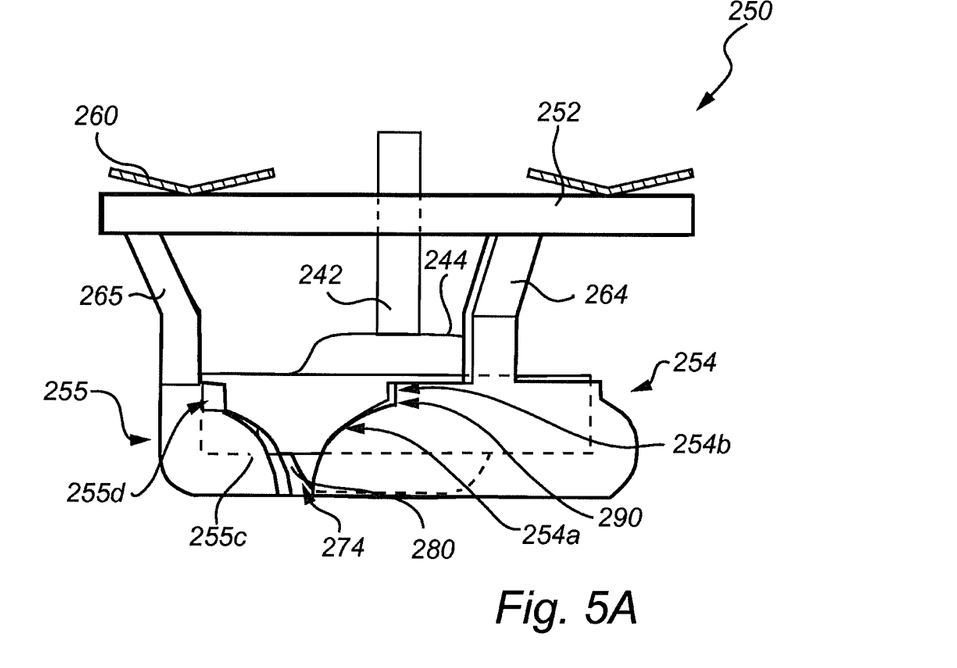
FIGS. 5a-5b are illustrating parts of the valve in FIGS. 4a-4b in greater detail according to at least one example embodiment of the invention.
Figure 5B:
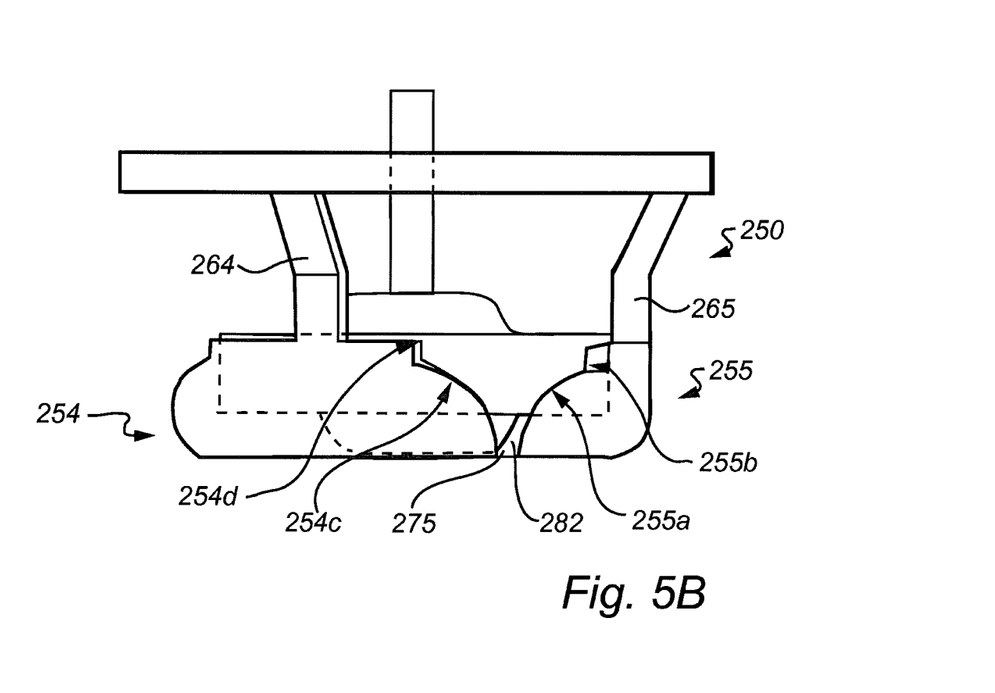

The valve insert 250 in FIGS. 4*a*-4*b* will now be described in greater detail with reference to FIGS. 5*a*-5*b* showing enlarged views of the valve insert 250 of FIGS. 4*a*-4*b* from two different perspectives. The valve insert 250 comprises a proximal portion 252, two distal portions 254, 255, that is a first distal portion 254 and a second distal portion 255, and two connecting legs 264, 265, each connecting leg 264, 265 connecting one of the distal portions 254, 255 to the proximal portion 252. However, it should be noted that the valve insert 250 could, as the valve insert 50 in FIGS. 1-2, comprise three distal portions, or even four or more distal portions. The two distal portions 254, 255 are similar or identical to each other, but are arranged in different positions in relation to the proximal portion 252. However, according to at least one example embodiment, at least one of the distal portions 254, 255 is different from at least one of the other distal portions 254, 255.

In a cylindrical coordinate system $(\rho, \varphi, z)$, similar to in FIGS. 1-2, the valve insert 250 has an extension in the circumferential direction $\varphi$ (corresponding to a direction of the angle of the angular coordinate $\varphi$), an extension in the radial direction $\rho$, and an extension in a direction being perpendicular to both the circumferential direction $\varphi$ and the radial direction $\rho$ corresponding a z-direction along the height z.

Each one of the distal portions 254, 255 has a main extension in the circumferential direction $\varphi$, an extension in the z-direction (corresponding to the height of each one of the distal portions 254, 255), and an extension in the radial direction (corresponding to the thickness of each one of the distal portions 254, 255). The height of each one of the distal portions 254, 255 are varying. Furthermore, as each one of the distal portions 254, 255 are beveled on a respective surface facing the distal chamber surface 234, the thickness of each one of the distal portions 254, 255 are varying. Each one of the distal portions 254, 255 is arranged as a circumferential segment, or as a ring-shaped segment, separated from the other distal portion 254, 255 by a respective small gap 274, 275. Alternatively, the two distal portions 254, 255 are in touching contact with each other.

Similar to the proximal portion 52 of the valve insert 50 in FIGS. 1-2, the proximal portion 252 has a main extension in the circumferential direction $\varphi$, an extension in the z-direction (corresponding to the height of proximal portion 252), and an extension in the radial direction (corresponding to the thickness of the proximal portion 252). The proximal portion 252 is ring-shaped and is non-segmented, i.e. it is continuous in the circumferential direction.

As mentioned above, each one of the distal portions 254, 255 is connected to the proximal portion 250 by the respective connecting legs 264, 265. Thus, a first connecting leg 264 is connecting the proximal portion 252 with the first distal portion 254, and a second connecting leg 265 is connecting the proximal portion 252 with the second distal portion 255. Each one of the connecting legs 264, 265 is connected centrally to the respective distal portion 265, 255. Furthermore, each one of the distal portions 254, 255 is symmetrical along a section where each one of the distal portions 254, 255 is connected to the respective connecting leg 264, 265.

As seen in FIGS. 4*a*-4*b* (and as indicated in FIGS. 5*a*-5*b* as well), the valve 201 further comprises a spring 260 arranged between the proximal chamber surface 232 and the proximal portion 252 of the valve insert 250. Similar to the valve insert 50 of FIGS. 1-2, a receiving portion 236 in the distal chamber surface 234 (being arranged to receiving the distal portions 254, 255) is beveled. Furthermore, a receiving portion facing surface of each one of the distal portions 254, 255 is beveled in order to correspond to the receiving portion 236 (this is similar to the beveled surface 57-59 in FIG. 3). Hereby, the force exerted from the spring 260 to the valve insert 250 in a proximal-distal direction may be transferred to a radial force via the beveled receiving portion 236 and the beveled receiving portion facing surfaces. Hereby, the distal portions 254, 255 can be pressed towards each other and the gaps between the two distal portions 254, 255 may become very small or alternatively be eliminated.

At least one of the distal portions 254, 255 is resiliently arranged in a similar manner as the distal portions 54-56 described with reference to FIGS. 1-2. Thus, the effects and features of the at least one resiliently arranged distal portion 254, 255 is the same, or very similar to the effects and features mentioned above with reference to FIGS. 1-2, and will thus not be repeated here. However, as already mentioned, the number of distal portions of the valve inert 250 in FIGS. 4*a*-4*b* and FIGS. 5*a*-5*b* is two compared to three distal portions 54-56 of FIGS. 1-2.

As shown in FIGS. 4*a*-4*b* and FIGS. 5*a*-5*b*, the valve plug 244 is arranged inside of the valve insert 250, and acts a stop for the two distal portions 254, 255 as they are pressed towards each other by the spring 260 as previously described. The arrangement of the valve plug 244 and the distal portions 254, 255 provide flow-through sections 280, 282 where the fluid may flow through the valve insert 250. As the valve insert 250 here comprises two distal portions 254, 255, two flow-through sections 280, 282 are formed. The first flow-through section 280 is defined by a plane extending at least between a portion of the valve plug 244, a portion of the first distal portion 254, and a portion of the second distal portion 255. The second flow-through section 282 is defined by a plane extending at least between another portion of the valve plug 244, another portion of the first distal portion 254, and another portion of the second distal portion 255.

The structure of the distal portions 254, 255 will now be explained in further detail with reference to FIGS. 5*a*-5*b*, whereafter the first and second flow-through sections 280, 282 will be described further.

The two distal portions 254, 255 are as mentioned above symmetrical along a section where they are connected to the respective connecting leg 264, 265. A first portion 254*a* of the first distal portion 254 is curved in the z-direction from the gap 274 towards the connecting leg 264. In other words, the height of the first portion 254*a* of the first distal portion 254 is varying, or is continuously varying. For example, the first portion 254*a* may be shaped to be relatively sharp close to the gap 274, and relatively flat closer to the connecting leg 264. A second portion 254*b* being adjacent to the first portion 254*a* of the first distal portion 254 is formed as a step 254*b* in the z-direction from the first portion 254*a* towards the connecting leg 264. The step 254 comprises a lateral side which is extending substantially in the z-direction, and a perpendicular side being perpendicular to the lateral side and having a constant height. Furthermore, as the first distal portion 254 is symmetrical, it comprises a third portion 254*c* arranged on an opposite side of the connecting leg 264 compared to the first portion 254*a*, the third portion 254*c* being mirrored but otherwise identical to the first portion 254*a*. However, according to at least one example embodiment, the third portion 254*c* is designed slightly different compared to the first portion 254*a*. Furthermore, the first distal portion 254 comprises a fourth portion 254*d* arranged on an opposite side of the connecting leg 264 compared to the second portion 254*b*, the fourth portion 254*d* being mirrored but otherwise identical to the second portion 254*b*. However, according to at least one example embodiment, the fourth portion 254*d* is designed slightly different compared to the second portion 254*b*.

The second distal portion 255 is here illustrated as being identical, or at least very similar to the first distal portion 254. Hence, the second distal portion 255 comprises corresponding first and third portions 255*a*, 255*c* having a varying height and being arranged on opposite sides to each other of the second connecting leg 265, and second and fourth portions 255*b*, 255*d* being arranged as steps 255*b*, 255*d* and being arranged on opposite sides to each other of the second connecting leg 265.

It should be noted that the portion of the valve plug 244 facing the fluid from the fluid inlet 224, typically a side of the valve plug 244 facing opposite to the proximal chamber surface 232, may be referred to as a controlling portion 245 of the valve plug 244.

Thus, the first flow-through section 280 may either be defined by a plane extending between a portion of the valve plug 244 (such as a portion of the controlling portion 245 of the valve plug 244) the first portion 254*a* of the first distal portion 254, and the third portion 255*c* of the second distal portion 255, if the valve plug 244 is arranged as in FIG. 4*a* and FIG. 5*a*, or by a plane extending between another portion of the valve plug 244 (such as a portion of the controlling portion 245 of the valve plug 244), the first and second portions 254*a*, 254*b* of the first distal portion 254, and the third and fourth portions 254*c*, 254*d* of the second distal portion 255, 274 if the valve plug 244 is arranged as in FIG. 4*b*.

It should be noted that the valve plug 244 may be positioned in various positions inside the valve insert 250. In a closed state, the valve plug 244 is arranged in a closed position wherein it is resting against the valve seat 246 and no fluid, or only a leakage flow, is allowed to flow through the chamber 230 via the valve insert 250. Hence, according to at least one example embodiment, the valve plug 244 may be positioned in a sealing contact with the valve seat 246. In a first open state, the valve plug 244 is arranged in a first open position where the valve plug 244 is distant from the valve seat 246 and fluid is allowed to flow through the chamber 230 via the valve insert 250. Furthermore, for the valve 201 shown in FIGS. 4*a*-4*b*, the valve plug 244 may be arranged in a second open position in which the valve plug 244 is less distant from the valve seat 246 compared to when the valve plug 244 is arranged in its first open position.

The second open position of the valve plug 244 is defined as when the controlling portion 245 of the valve plug 244 is positioned at the same z-coordinate as an intersection 290 (indicated in FIG. 5*a*) between the first and second portions 254*a*, 254*b* of the first distal portion 254 (which for the valve insert 250 in FIGS. 4*a*-4*b* and FIGS. 5*a*-5*b* is at the same z-coordinate as an intersection between the first and second portions 255*a*, 255*b* of the second distal portion 255, and an intersection between the third and fourth portions 254*c*, 254*d*, 255*c*, 255*d* of the first and second distal portions 254, 255).

In FIG. 4*a*, the valve plug 244 is arranged between its closed position and its second open position. Hence, the first flow-through section 280 is here defined by a plane extending between a portion of the valve plug 244 (such as a portion of the controlling portion 245 of the valve plug 244), the first portion 254*a* of the first distal portion 254, and the third portion 254*c* of the second distal portion 255, and fluid is allowed to flow through the first flow-through section 280. Similarly, but not shown in FIG. 4*a* as it is hidden behind the first and second distal portions 254, 255, the second flow-through section 282 (shown in FIG. 5*b*) is defined by a plane extending between a portion of the valve plug 244 (such as a portion of the controlling portion 245 of the valve plug 244), the first portion 255*a* of the second distal portion 255, and the third portion 254*c* of the first distal portion 254, and fluid is allowed to flow through the second flow-through section 282, see FIG. 5*b*.

When the valve plug 244 is arranged between its closed position and its second open position, the first and the second flow-through sections 280, 282 are at least partly defined by a respective plane extending between the first and third portions 254*a*, 255*c* by the first distal portion 254 and the second distal portion 255 respectively, a change of the valve plug 244 anywhere between its closed position and its second open position will result in a change of cross sectional area of the flow-through sections 280, 282, and hence a change in fluid flow through the first and second flow-through sections 280, 282 in accordance with a first valve characteristic function. The first valve characteristic function is characterised at least by the shape of the first and third portions 254*a*, 255*c* and specifically by their inclined or beveled shape, i.e. the varying height of the first and third portions 254*a*, 255*c* of the first distal portion 254 and the second distal portion 255 respectively. Hence, two subsequent positional changes of the same size and in the same direction (i.e. in the same z-direction) of the valve plug 244, anywhere between the closed position and the second open position, will result in two different changes of cross sectional area of the flow-through sections 280, 282, and hence two different changes in fluid flow through the first and second flow-through sections 280, 282. The two subsequently occurring different changes of the cross sectional area (and hence the fluid flow) will follow the first valve characteristic function.

In other words, the first valve characteristic function is defined as a first function $f1(X)=Y$ wherein X is the distance of the valve plug 244 compared to the valve seat 246 (preferably the distance in the z-direction from the controlling portion 245 of the valve plug 244 and the valve seat 246). X=0 is defining the valve plug 244 in its closed position and Y is the cross sectional area of the flow-through sections, i.e. the combined cross sectional area of the first and second flow-through sections 280, 282.

When the valve plug 244 is moved close to its closing position, a given change in the position of the valve plug 244 will result in a relatively small change in cross sectional area of the flow-through sections 280, 282 (and hence a relatively small change in fluid flow), compared to when the valve plug is moved close to its second open position where an equal change (in size and direction) in the position of the valve plug will result in a relatively large change in cross sectional area of the flow-through sections 280, 282 (and hence a relatively large change in fluid flow).

In FIG. 4b, the valve plug 244 is arranged between its second open position and its first open position. Hence, the first flow-through section 280 is here defined by a plane extending between a portion of the valve plug 244 (such as a portion of the controlling portion 245 of the valve plug 244), the first and second portions 254a, 254b of the first distal portion 254, and the third and fourth portions 255c, 255d of the second distal portion 255, and fluid is allowed to flow through the first flow-through section 280. Similarly, but not shown in FIG. 4b as it is hidden behind the first and second distal portions 254, 255, the second flow-through section 282 is defined by a plane extending between a portion of the valve plug 244 (such as a portion of the controlling portion 245 of the valve plug 244), the first and second portions 255a, 255b of the second distal portion 255, and the third and fourth portions 254c, 254d of the first distal portion 254, and fluid is allowed to flow through the second flow-through section 282.

As the first and the second flow-through sections in FIG. 4b are defined at least by the first, second, third and fourth portions 254a-D, 255a-D by the first and second distal portions 254, 255, a change of the valve plug 244 anywhere between its second open position and its first open position will result in a change of cross sectional area of the flow-through sections, and hence a change in fluid flow through the first and second flow-through sections, in accordance with a second valve characteristic function being different to the first valve characteristic function. The second valve characteristic function is characterised at least by the shape of the second portions 254b, 255b and the fourth portions 254d, 255d of the first and second distal portions 254, 255 respectively, and specifically by their step-shaped configuration. Hence, two subsequent positional changes of the same size and in the same direction (i.e. in the same z-direction) of the valve plug 244, anywhere between the second open position and the first open position, will result in two equal (or substantially equal) increases or decreases (depending on direction of the valve plug motion) of the cross sectional area of the flow-through sections 280, 282 and fluid flow through the first and second flow-through sections 280, 282. The two subsequently occurring different increases or decrease of the cross sectional area of the flow-through sections 280, 282 (as well as the increase or decrease of fluid flow) will follow the second valve characteristic function.

In other words, the second valve characteristic function may be defined as a second function f2(X)=Y wherein X is the distance of the valve plug 244 compared to the valve seat 246 (preferably the distance in the z-direction from the controlling portion 245 of the valve plug 244 and the valve seat 246). X=0 is defining the valve plug 244 in its closed position and Y is the combined cross sectional area of the first and the second flow-through sections 280, 282.

According to at least one example embodiment, the derivate of the first function df1(X)/dY is different compared to the derivate of the second function df2(X)/dY over at least a majority of distance X.

Hence the first and third portions 254a, 254c, 255a, 255c of the first and second distal portions 254, 255 may each be referred to as first characteristic controlling portions as the shape of these portions 254a, 254c, 255a, 255c at least partly defines the first valve characteristic function (i.e. when the valve plug 244 is changing its position anywhere between its closed position and its second open position). Correspondingly, the second and fourth portions 254b, 254d, 255b, 255d of the first and second distal portions 254, 255 may each be referred to as second characteristic controlling portions as the shape of these portions 254b, 254d, 255b, 255d at least partly defines the second valve characteristic function (i.e. when the valve plug 244 is changing its position anywhere between its second open position and its first open position).

It should be noted that the cross sectional area of the first flow-through section 280 may be described as a curved plane having an extension in the z, φ-directions (i.e. a plane located at a constant ρ) and extending between a portion of the controlling portion 245 of valve plug 244, and the first and third portions 254a, 255c of the first and second distal portions 254, 255 respectively, or the first and second portions 254a, 254b of the first distal portion 254 together with the third and fourth portions 255c, 255d of the second distal portion 255 (depending on the position of the valve plug 244) (the first gap 274 may, but do not have to, be comprised in the first flow-through section 280 according to one example embodiment, for such embodiment the first flow-through section 280 extends to the distal chamber surface 232, correspondingly, the second gap 275 may, but do not have to, be comprised in the second flow-through section 282 according to one example embodiment, for such embodiment the second flow-through section 282 extends to the distal chamber surface 232). Correspondingly, the cross sectional area of the second flow-through section 282 may be described as a curved plane having an extension in the z, φ-directions (i.e. a plane located at a constant ρ) and extending between a portion of the controlling portion 245 of valve plug 244, and the first and third portions 255a, 254c of the second and first distal portions 255, 254 respectively, or the first and second portions 255a, 255b of the second distal portion 255 together with the third and fourth portions 254c, 254d of the first distal portion 254 (depending on the position of the valve plug 244). Thus, the flow through sections 280, 282 may also be referred to as flow through areas 280, 282 where the fluid is flowing through.

It should be noted that the valve insert 250 can be arranged in a valve in the same way as valve insert 50 in the valve 1 of FIG. 1. Thus, in such embodiments, fluid flow from the fluid inlet 224 is entering the chamber 230 by flowing radially internally of the distal portions 254, 255, and further outside of the valve insert 250 via the two flow through sections 280, 282. However, according to at least one example embodiment, the valve insert 250 is installed in a valve where the fluid flow is allowed to flow from outside of the valve insert 250 to the inside of the valve insert 250.

The first open position of the valve plug 44, 244 may be a fully open position of the valve plug, e.g. if the valve insert 50, 250 provides the function of only two different valve characteristic functions. However, according to at least one example embodiment, the valve insert 50, 250 is arranged to provide more than two valve characteristic functions, e.g. by having more portions shaped differently compared to a neighbouring portion. In such cases, the first open position of the valve plug 44, 244 may be different from the fully open position of the valve plug 44, 244, and the valve plug 44, 244 may be positioned in at least a third open position in where the valve plug 44, 244 is arranged closer to the proximal chamber surface 32, 232 compared to when it is in its first open position. The third open position of the valve plug 44, 244 may be, but does not have to be, the fully open position of the valve plug 44, 244. To clarify, in embodiments where there is at least a third open position, the first open position will be positioned between the second open position and the third open position.

Turning back to FIG. 2 where each of the distal portions 54-56 only comprises a respective first portion 54a-56a and a respective second portion 54b-56c. The respective first and second portions 54a-56a, 54b-56b are inclined or beveled (i.e. they have a varying height) and are arranged on the respective distal portions 54-56 on opposite sides of the respective connecting legs 64-66 (hence each pair of first and second portions 54a, 54b, 55a, 55b, 56a, 55b are mirrored compared to each other). Hence, for the valve 1 in FIG. 1, only one valve characteristic function is induced by the valve insert 50, the valve characteristic being similar to that of the first valve characteristic function for the valve 201 in FIGS. 4a-4b and 5a-5b, why an analogical discussion is not repeated here but is only briefly commented. Two subsequent positional changes of the same size and in the same direction (i.e. in the same z-direction) of the valve plug 44, anywhere between its closed position and one of its open positions, will result in two different changes of the cross sectional area of the flow-through sections, and hence two different changes in fluid flow through the valve insert 50. The two subsequently occurring different changes in cross sectional area of the flow-through sections and hence of the fluid flow will be in accordance with the valve characteristic function of the valve 1.

It should be understood that the inventive concept is not limited to the described exemplary embodiments; rather the scope being generally defined by the accompanying claims. For example, as mentioned above, the differential valve part in FIG. 1 may be dispensed with, as shown in FIGS. 4a-4b. Thus, if the differential valve part in FIG. 1 is omitted, the fluid inlet 24 is redefined from prior to the pressure differential valve part 10, to the fluid passage 15.

The invention claimed is:

1. A valve for controlling fluid flow, said valve comprising:
   a valve body,
   a chamber arranged inside said valve body, said chamber having a proximal chamber surface and a distal chamber surface being opposite to said proximal chamber surface,
   a fluid inlet for providing fluid to said chamber,
   a fluid outlet for receiving fluid from said chamber,
   a valve rod arranged at least partly inside said chamber,
   a valve plug arranged to be moved inside said chamber, said valve plug being connected to an end portion of said valve rod, said valve rod and said valve plug being configured to control fluid flow from said fluid inlet to said fluid outlet via said chamber,
   a valve insert arranged at least partly inside said chamber, said valve insert comprising a proximal portion and at least two distal portions, wherein said valve plug is adapted to be guided through at least a part of said valve insert, wherein at least one of said distal portions of said valve insert is resiliently arranged relative said proximal portion in order for the distal portions to be movable relative each other, and
   a spring arranged between said proximal chamber surface and said proximal portion of said valve insert, said spring being arranged to press said valve insert towards said distal chamber surface, wherein said valve insert and said spring are arranged inside said chamber in such a way that said distal portions are pressed against said valve plug by said spring.

2. A valve according to claim 1, wherein at least one of said distal portions of said valve insert in a first state is adapted to be moved towards at least one other distal portion of the valve insert, and in a second state is adapted to be moved away from at least one other distal portion of the valve insert.

3. A valve according to claim 1, wherein said distal portions are separated by a gap in a circumferential direction of said valve insert.

4. A valve according to claim 1, wherein said distal portions have a main extension in a circumferential direction of said valve insert, and wherein each one of said distal portions is arranged as a circumferential segment.

5. A valve according to claim 1, wherein said proximal portion has a main extension in a circumferential direction of said valve insert.

6. A valve according to claim 1, wherein said proximal portion is connected to each one of said distal portions by a respective connecting leg.

7. A valve according to claim 1, wherein a portion of said distal chamber surface defines a receiving portion for said valve insert, and wherein said receiving portion is bevelled.

8. A valve according to claim 7, wherein a receiving portion facing surface of each one of the distal portions is bevelled in a corresponding manner as said receiving portion.

9. A valve according to claim 1, wherein said valve plug comprises a controlling portion, said controlling portion being arranged to control fluid flow from an inside of said valve insert to an outside of said valve insert or from an outside of said valve insert to an inside of said valve insert.

10. A valve according to claim 9, wherein each one of said distal portions comprises a characteristic controlling portion having a varying height in a circumferential direction of said valve insert.

11. A valve according to claim 10, wherein said characteristic controlling portions is first characteristic controlling portion, and each one of said distal portions comprises a second characteristic controlling portion formed as a step.

12. A valve according to claim 10, wherein said valve can be arranged in:
   a closed state in which said valve plug is arranged in a closed position wherein said valve plug is in sealing contact with a valve seat in order to allow no fluid, or only a leakage flow, to flow via said chamber,
   a first open state in which said valve plug is arranged in a first open position wherein said valve plug is distant from said valve seat, and
   a second open state in which said valve plug is arranged in a second open position wherein said valve plug is less distant from said valve seat compared to when said valve plug is in its first open position,
   and wherein when said valve plug is positioned between a closed position and a second open position, said valve plug allows fluid flow through said chamber and through said valve insert over said characteristic controlling portions, and wherein a change of said valve plug position anywhere between the closed position and the second open position results in a change of fluid flow through said chamber in accordance with a first valve characteristic function.

13. A control valve according to claim 11, wherein when said valve plug is positioned between the second open position and the first open position, said valve plug allows fluid flow through said chamber and through said valve insert over said first and said second characteristic controlling portions, and wherein a change of said valve plug position anywhere between the second open position and the first open position results in a change of fluid flow through said chamber in accordance with a second valve characteristic function.

14. A valve according to claim 1, comprising a fluid passageway directing fluid from said fluid inlet to said fluid outlet via said chamber, wherein the fluid passageway directs fluid through said valve insert, in a direction from said distal portions of the valve insert towards said proximal portion of the valve insert.

15. A valve for controlling fluid flow, said valve comprising:
- a valve body,
- a chamber arranged inside said valve body, said chamber having a proximal chamber surface and a distal chamber surface being opposite to said proximal chamber surface,
- a fluid inlet for providing fluid to said chamber,
- a fluid outlet for receiving fluid from said chamber,
- a valve rod arranged at least partly inside said chamber,
- a valve plug arranged to be moved inside said chamber, said valve plug being connected to an end portion of said valve rod, said valve rod and said valve plug being configured to control fluid flow from said fluid inlet to said fluid outlet via said chamber,
- a valve insert arranged at least partly inside said chamber, said valve insert comprising a proximal portion and at least two distal portions, wherein said valve plug is adapted to be guided through at least a part of said valve insert, wherein at least one of said distal portions of said valve insert is resiliently arranged relative said proximal portion in order for the distal portions to be movable relative each other,
- wherein said valve insert includes a spring portion, said spring portion being arranged to press said valve insert towards said distal chamber surface, wherein said valve insert is arranged inside said chamber in such a way that said distal portions are pressed against said valve plug by said spring portion.

16. A valve according to claim 15, wherein at least one of said distal portions of said valve insert in a first state is adapted to be moved towards at least one other distal portion of the valve insert, and in a second state is adapted to be moved away from at least one other distal portion of the valve insert.

17. A valve according to claim 15, wherein said distal portions are separated by a gap in a circumferential direction of said valve insert.

18. A valve according to claim 15, wherein said distal portions have a main extension in a circumferential direction of said valve insert, and wherein each one of said distal portions is arranged as a circumferential segment.

19. A valve according to claim 15, wherein said proximal portion has a main extension in a circumferential direction of said valve insert.

20. A valve according to claim 15, wherein said proximal portion is connected to each one of said distal portions by a respective connecting leg.

* * * * *